Patented Sept. 11, 1951

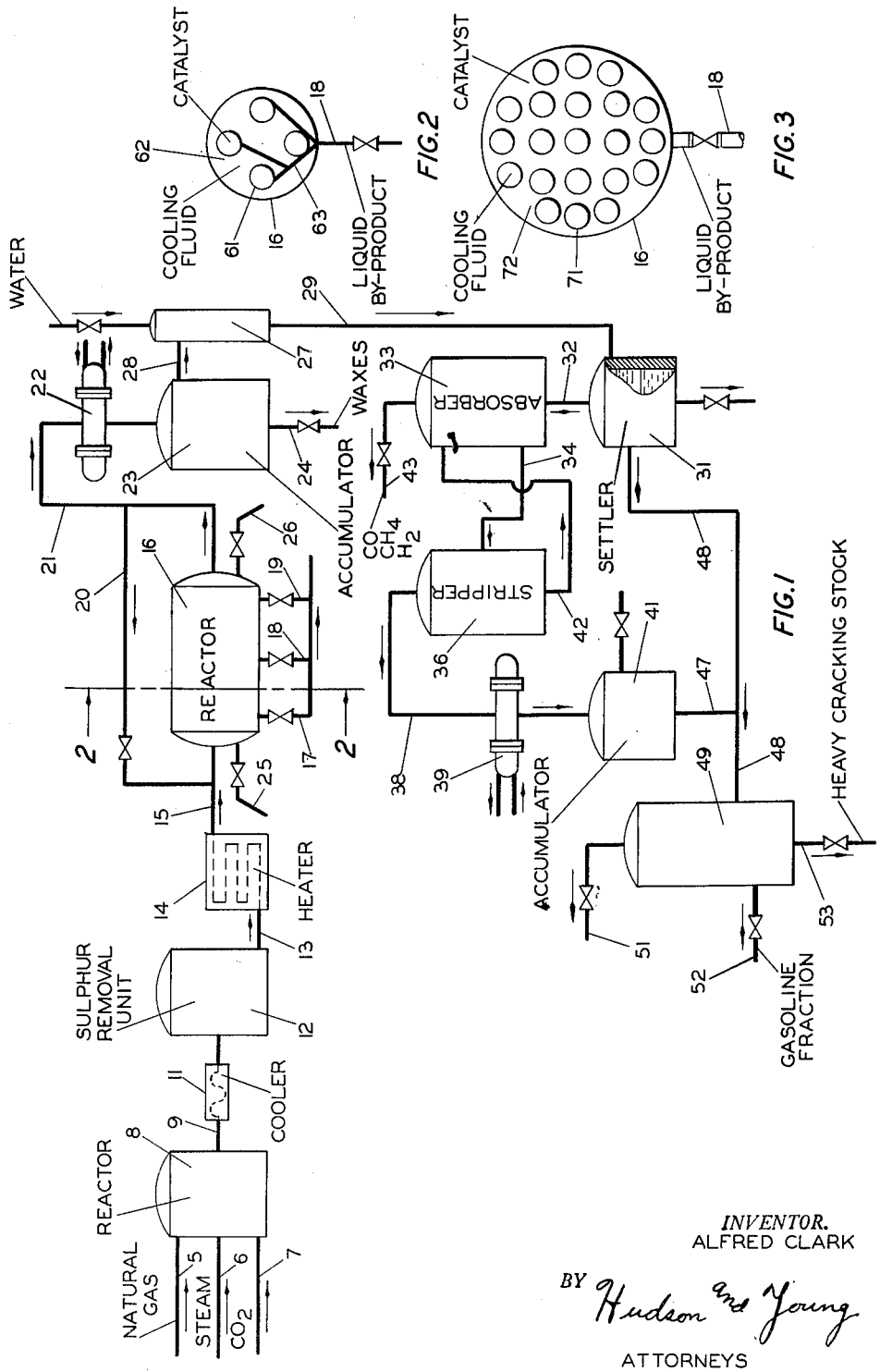

2,567,596

UNITED STATES PATENT OFFICE 2,567,596

SYNTHESIS OF HYDROCARBONS

Alfred Clark, Bartlesville, Okla., assignor to Phillips Petroleum Company, a corporation of Delaware Application March 25, 1946, Serial No. 656,965

4 Claims. (Cl. 260—449.6)

This invention relates to the synthesis of hydrocarbons. One aspect of this invention relates to the conversion of hydrogen and an oxide of carbon into hydrocarbons. Still another aspect of this invention relates to the prevention of the accumulation in a reaction zone of liquid byproducts formed during the synthesis of hydrocarbons having more than one carbon atom per molecule by the interaction of hydrogen and carbon monoxide in the presence of a catalyst.

The present application is a continuation-in-part of my copending application, Serial No. 616,929, filed September 17, 1945, now abandoned.

It has been known for some time that hydrogen and carbon monoxide may be made to react exothermically in the presence of certain catalysts and under specific reaction conditions to form hydrocarbons and oxygenated compounds. The formation of hydrocarbons having more than one carbon atom per molecule, especially those hydrocarbons boiling within the gasoline range, is favored by relatively low pressures and low temperatures. In general, the synthesis of hydrocarbons by the hydrogenation of carbon monoxide is accomplished in the presence of a metal chosen from the group VIII of the periodic table as a catalyst at pressures below about 500 pounds per square inch gage and at temperatures below about 350° C. The synthesis feed gas comprises a mixture of about 2 moles of hydrogen per mole of carbon monoxide and is prepared by the catalytic conversion of natural gas, steam and carbon dioxide. Characteristically, under the conditions prevailing in the reaction zone liquid byproducts are formed therein. These liquid byproducts tend to accumulate and decrease the efficiency of the catalyst. It has been found that accurate control of the reaction conditions and removal of liquid by-products from the reaction zone are necessary to obtain an optimum yield of the desired product.

The approximate linear free energy-temperature relations for the synthesis of methane, ethane, normal hexene, normal hexane, and normal octane, are illustrated by the following over-all equations for reactions occurring in the gas phase with nickel or cobalt catalysts. These equations are represented graphically in "The Chemistry of Petroleum Derivatives" by Carleton Ellis, vol. II, 1934; page 1226.

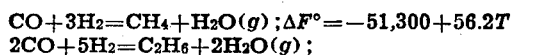
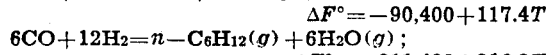
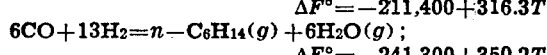
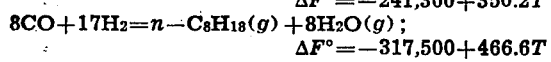

($\Delta F°$=calories per gram mol, $T$=temperature in °Kelvin.)

The production of hydrocarbons, including hydrocarbons which are liquid under the prevailing reaction conditions, from carbon monoxide and hydrogen is favored thermodynamically, as is evident from the large negative values of the standard free energy change ($\Delta F°$) for the over-all reactions. In the series, methane, ethane, normal hexane, and normal octane, the free energy change becomes more negative with the size of the molecule so that the formation of higher members of the series is quite feasible. At about 300° C., and atmospheric pressure, it is possible to obtain any of the paraffin hydrocarbons by reduction of carbon monoxide in the presence of appropriate catalysts. The validity of this conclusion has been confirmed by the isolation and identification of some of the reaction products which included practically all the members of the aliphatic series from ethane to hectopentacontane ($C_{150}H_{302}$).

In the hydrogenation of carbon monoxide, the relatively high-boiling hydrocarbons are formed simultaneously with the formation of the more desirable lower-boiling products. These high-boiling hydrocarbons are present as liquids in the reaction zone under the reaction conditions prevailing therein. The presence of liquid high-boiling hydrocarbons in the reaction zone is highly undesirable since the liquid hydrocarbons accumulate and cover the synthesis catalyst, preventing intimate contact between the synthesis gas and the catalyst. The result is a decrease in both the life of the catalyst and the yield of desirable product. Moreover, some of the liquid hydrocarbons eventually decompose to form carbonaceous deposits on the catalyst particles which carbonaceous deposits greatly decrease the activity of the catalyst and often permanently poison the catalyst itself. Consequently, it is highly desirable to prevent the accumulation of high-boiling liquid hydrocarbons in the reaction zone.

The object of this invention is to prevent the accumulation of liquid hydrocarbons in the reaction zone during the hydrogenation of carbon monoxide.

It is another object to provide a novel method and apparatus for removing liquids from a reaction zone.

Still another object is to increase activity and life of the catalyst in a process for the synthesis of hydrocarbons from hydrogen and an oxide of carbon.

Another object is to increase the yield of normally liquid hydrocarbons and decrease the formation of higher-boiling hydrocarbons during the hydrogenation of carbon monoxide in the presence of a suitable catalyst.

It is still another object of this invention to promote more intimate contact between synthesis catalyst and reactants in the synthesis of hydrocarbons from hydrogen and carbon monoxide.

Further objects and advantages will become apparent to those skilled in the art from the accompanying description and disclosure.

According to this invention, liquid by-products are prevented from accumulating in a catalyst reaction zone wherein hydrogen and an oxide of a carbon are reacted to form hydrocarbons by removing the liquid by-products from the reaction zone as they are formed. In one embodiment hydrogen and carbon monoxide are passed through a reaction zone containing a suitable synthesis catalyst under conditions such that hydrocarbons are formed. Liquid material, which is formed as a by-product of the synthesis reaction and which tends to cover the surface of the catalyst, is removed from the reaction zone over a shorter route than that route traversed by the reactant gases passing through the reaction zone. In this manner undesirable liquid hydrocarbons are prevented from accumulating as much on the catalyst as would occur by the removal of liquid hydrocarbons over a similar route as traversed by the reactant gases. By removing liquid hydrocarbons in the manner described herein, the thickness of the liquid film on the surface of the catalyst is substantially decreased. In the preferred manner of operating the present invention the time of contact of the liquid hydrocarbons with the catalyst and reactant gases is also substantially decreased which results in a decrease in the viscosity of the liquid hydrocarbons as well as a decrease in the decomposition of the liquid hydrocarbon into injurious carbonaceous deposits. To accomplish more rapid removal of the liquid hydrocarbons, mechanical means to increase the rate of flow may be used, or the route of removal shortened, or both. Usually the liquids are removed through a plurality of outlets from the reaction zone angularly to the flow of reactant gases therethrough.

According to a preferred embodiment of this invention the accumulation of liquid hydrocarbons and their removal is effected by conducting the hydrogenation of carbon monoxide in a horizontal elongated reaction chamber. The reactants enter one end of the elongated reaction chamber and a reaction effluent is removed from the other end. Liquid hydrocarbons formed during the hydrogenation reaction flow by gravity to the lower or bottom side of the horizontal reaction chamber and are drained from the chamber through a plurality of outlets spaced at intervals longitudinally along the bottom side of the reaction chamber.

Various modifications of the present invention may be used. For example, the reaction chamber may be placed in a slanting position rather than horizontal, with one end slightly lower than the other and draining the liquid hydrocarbons from the reaction chamber by means of a single outlet at the lower end. The reaction chamber may also be so constructed, by inserting a plurality of tubes longitudinally through the reaction chamber, that a cooling fluid could be passed therethrough in order to maintain the appropriate reaction temperature within the chamber. The cooling fluid may be passed through the inserted tubes themselves; or the tubes may be filled with catalyst and the reactants passed through the tubes, and the cooling fluid passed through the passageway between the shell of the chamber and tubes.

As previously discussed, it is highly desirable to prevent the accumulation of liquid hydrocarbons in the reaction zone of a hydrocarbon synthesis since the liquid hydrocarbons cover the catalyst and prevent intimate contact between catalyst and reaction gas and also decrease the activity of the catalyst itself. Such liquid hydrocarbons usually comprise a mixture of hydrocarbons between about $C_{18}$ hydrocarbons and about $C_{150}$ hydrocarbons having an average molecular weight of about 750. Some oxygenated compounds may also be present as liquids which will be removed with the liquid hydrocarbons.

In the hydrogenation of carbon monoxide, in general, appropriate catalysts are those which have substantial hydrogenating power at low temperatures. Such catalysts comprise a metal or compound of a metal from group VIII of the periodic table, such as iron, cobalt and nickel. Cerium, manganese, titanium, zinc, thorium, and the oxides and other compounds of these metals have also been found to possess the necessary characteristics suitable for hydrogenating carbon monoxide to hydrocarbons. Mixtures of such catalysts may be employed or suitable agents or carriers may be impregnated with the catalysts to increase their efficiency and strength. The catalysts are usually in a finely divided form, such as pellets or granules.

Table I below shows the reaction conditions of temperature, pressure, and space velocity characteristic of some of the various catalysts which may be used in effecting the synthesis of hydrocarbons having more than one carbon atom per molecule.

TABLE I

Preferred ranges of operation of some common catalysts for the production of synthetic hydrocarbons

| | Catalyst | Pref. Temperature, °C. | Pref. Pressure, p.s.i.g. | Pref. Space Velocities, vol./vol. cat./hr. |
|---|---|---|---|---|
| 1 | Cobalt-Thoria | 190–210 | 100 | 90–110 |
| 2 | Iron-Alkali and/or Copper | 230–260 | 75–300 | 90–110 |
| 3 | Sintered Iron | 310–330 | 220–300 | [1] 250–300 |
| 4 | Ruthenium | 190–210 | 1200–1500 | 90–110 |
| 5 | Nickel-Thoria | 190–210 | 15–50 | 90–110 |
| 6 | Nickel-Manganese-Alumina | 190–210 | 15–50 | 90–110 |
| 7 | Cobalt | 180–200 | 100 | 95–115 |

[1] Recycle to feed ratio of 25–100:1.

In general, the temperature range for the various catalysts which may be used to effect a synthesis of hydrocarbons is between about 150 and 400° C.

In carrying out the process of this invention, pressures ranging from sub-atmospheric to as high as about 2000 pounds per square inch gage may be used, but the preferred range is from about 15 to about 500 pounds per square inch gage, more particularly from about 100 to about 125 pounds per square inch gage.

Space velocities may be varied over a considerable range from low velocities of approximately 80 cubic feet per cubic foot of catalyst per hour such as are used normally over cobalt catalysts, up to about 400 or even as high as 30,000 cubic feet per cubic foot of catalyst per hour, such as are used over the sintered iron catalysts. These values represent the extremes in space velocities which may be used in carrying out this invention. Space velocities may be defined as volumes of gas at standard conditions of temperature and pressure per volume of catalyst per hour.

The composition of the synthesis feed gas is normally in a molar ratio of hydrogen to carbon monoxide between about 3:1 and about 1:1, however, for optimum yield of normally liquid hydrocarbons a ratio between about 2:1 and about 3:2 is preferred.

Upon use the catalysts may decrease in activity as the result of deposition of carbonaceous deposits thereon. Regeneration of the catalysts may be effected in conventional manner, such as by treatment with hydrogen at elevated temperatures.

By the process of this invention higher yields have been observed than obtained by conventional methods. Of the total hydrocarbon product, the normally liquid hydrocarbons constituted as high as about 75% by weight.

Figure 1 of the drawings diagrammatically represents apparatus for a typical process for the synthesis of hydrocarbons in which an embodiment of the present invention is applicable.

Figure 2 of the drawings represents a cross-sectional view of element 16 of Figure 1 taken along line 2—2 in the direction indicated and illustrates the construction of reactor 16 embodying the present invention when a cooling fluid is used to maintain the reaction temperature.

Figure 3 is another modification of reaction chamber 16 shown in cross section similar to Figure 2.

In order that this invention may be more clearly understood and its applicability realized, a brief description of a typical process for the synthesis of hydrocarbons will be illustrated. Natural gas containing methane, steam and carbon dioxide obtained from suitable sources are introduced into a reactor 8 through lines 5, 6 and 7, respectively. Hydrogen and carbon monoxide are formed in reactor 8 in the presence of a suitable catalyst, such as nickel, at approximately atmospheric pressure and at a temperature between about 700 and about 800° C. The effluent from reactor 8 contains hydrogen and carbon monoxide in a molar ratio of about 2:1, and about 0.5 to about 1.0 mol per cent impurities, such as sulfur.

From reactor 8, the effluent passes to a sulfur removal unit 12 by line 9 and through a cooler 11. Both inorganic and organic sulfur are removed from the effluent in unit 12 by conventional methods known in the art. Inorganic sulfur may be removed by solvent extraction with a solvent, such as an amine solution. Organic sulfur compounds are decomposed in the presence of a suitable catalyst, such as a copper oxide-lead chromate combination, at an elevated temperature of about 400° C. The resulting hydrogen sulfide from the decomposition is removed by solvent extraction. The purified effluent of hydrogen and carbon monoxide is then passed to a heater 14 by line 13 and thence to a substantially horizontal reactor 16 by line 15.

In reactor 16, hydrocarbons are synthesized under reaction conditions similar to those previously described and in the presence of a suitable catalyst, such as sintered iron, cobalt-thoria, etc. Liquid hydrocarbons present in the reaction zone 16 are removed therefrom through lines 17, 18 and 19. The construction of reactor 16 will be discussed more fully hereinafter with reference to Figure 2 of the drawings. Excess exothermic heat of reaction beyond that required to maintain the desired reaction temperature, for example 225° C., may be removed by passing a cooling fluid in indirect contact with reactants in reactor 16 through conduits 25 and 26. If desired, some heat of reaction may be removed by external cooling means or jacket (not shown). Reactor 16 contains a suitable catalyst for the synthesis of hydrocarbons, as previously discussed and shown in Table I.

From reactor 16 a vaporous effluent containing hydrocarbons is passed via line 21 to cooler 22 where partial condensation is effected and the condensate is collected in an accumulator 23 and discharged therefrom through line 24. A portion of the effluent may be recycled to reactor 16 via line 20, if desired. This condensate comprises heavy hydrocarbons and waxes. The temperature of the effluent gases leaving reactor 16 is about 200° C. and cooling the gases to about 150° C. is sufficient to accomplish the degree of partial condensation desired in accumulator 23. The uncondensed gases from accumulator 23 are passed through line 26 to cooling tower 27 wherein the gases are condensed by a spray of water which cools them to about 25° C. Water and liquid hydrocarbons are withdrawn from tower 27 through line 29 and are passed to settler 31 for a liquid phase separation between hydrocarbons and water.

Uncondensed gases leave settler 31 through line 32 and pass to mineral seal oil absorber 33. Recovery of propane, butane and heavier hydrocarbons is effected in absorber 33 by absorption of these hydrocarbons in mineral seal oil in the conventional manner. The hydrocarbon-rich mineral seal oil is withdrawn from the lower portion of absorber 33 and passed through line 34 to a stripping column 36. The light hydrocarbons, such as propane, butane, etc., are stripped from the mineral seal oil by lowering the pressure or by heating in stripping column 36. Recovered hydrocarbons from stripping column 36 are passed via line 38 and condenser 39 to an accumulator 41. After cooling (not shown) stripped mineral seal oil is recirculated to absorber 33 by means of line 42. Light gases such as hydrogen, methane, carbon monoxide, are removed from absorber 33 through line 43 and discarded or used as fuel, if desired. These gases may also be passed to a second and smaller reactor (not shown) for the conversion of the remaining hydrogen and carbon monoxide to hydrocarbons.

Liquid hydrocarbons from settler 31 and accumulator 41 are passed via lines 47 and 48 to fractionation unit 49 wherein desired products are separated and recovered. Light gases are withdrawn from fractionation unit 49 through line 51. Hydrocarbons boiling within the gasoline range are withdrawn through line 52, and heavier hydrocarbons are removed by line 53.

Figure 2 is a possible modification of reactor 16 shown in cross-section along line 2—2 in the direction indicated. A cooling fluid is passed through reactor 16 to maintain the desired temperature therein. According to this particular modification the reactants are passed through elongated tubes 61 inserted longitudinally in reactor 16. Tubes 61 are filled with a suitable catalyst as previously described. Liquid material drains to the bottom side of the separate tubes and may be removed therefrom through a plurality of outlets spaced along the lower or bottom side of tubes 61. The liquid material is discharged from reactor 16 itself through conduits 63 and 18. Cooling fluid is passed through reactor 16 through passageway 62 in indirect contact with the reactants in tubes 61. Cooling fluid may be passed countercurrently, or concurrently to the flow of the reactants; however, countercurrent flow is preferred.

Various types of cooling fluids may be used without departing from the scope of this invention. For example, typical cooling fluids comprise water, mineral seal oil, brine, propane, butane, Freon, etc.

Figure 3 is another modification of reactor 16 in which modification the cooling fluid is passed through a series of tubes 71 inserted in reactor 16 and the reactants pass through passageway 72 formed by the shell of reactor 16 and tubes 71. Liquid material drains to the bottom of horizontal reactor 16 and is withdrawn therefrom through conduit 18, etc. Passageway 72 is filled with suitable catalyst material.

In many instances indirect cooling of the reactants in reactor 16 is unnecessary, and, therefore, the tubes inserted within reactor 16 may be omitted. When indirect cooling is not used, reactor 16 comprises an elongated chamber which is positioned substantially horizontal and is filled with a catalyst material. The reactants are introduced into one end of reactor 16 and an effluent is discharged from the other end of reactor 16.

The following example illustrates the results which may be obtained by operating a hydrocarbon synthesis process according to the present invention but is not considered limiting to the invention in any manner.

EXAMPLE

A reaction chamber similar in design to the one illustrated in Figure 3, 10 feet in length, 2 feet in diameter, containing 113¾-inch standard-pipe cooling tubes, and 4 outlets on the outer shell at 2, 4, 6 and 8 feet from the inlet end, is charged with a cobalt-thoria catalyst. The unit is operated at 195° C., at a space velocity of 100 volumes free gas at standard conditions per volume of catalyst per hour. The feed gas consists of 2 parts of hydrogen and one part of carbon monoxide by volume. The reaction pressure is 100 pounds per square inch gage. The yield of liquid hydrocarbons is approximately 100 grams per standard cubic meter and the conversion of carbon monoxide in a single pass is approximately 70 per cent. The condensed products obtained at the four outlets is about 20 to about 25 per cent of the total product and contains less wax than the product obtained by conventional operation. The catalyst may be operated efficiently for several weeks without resorting to a regeneration treatment to remove waxy material from the surface of the catalyst.

Various alterations, modifications and omissions may become apparent to those skilled in the art without departing from the scope of this invention.

Having described my invention, I claim:

1. In a process for the synthesis of normally liquid hydrocarbons which comprises passing a mixture of hydrogen and carbon monoxide through a reaction zone in the presence of a suitable synthesis catalyst under reaction conditions, including a temperature in the range of 150 to 400° C., such that gaseous and liquid hydrocarbons are formed in said reaction zone under conditions prevailing therein, removing a gaseous effluent from said reaction zone, and separating normally liquid hydrocarbons therefrom, the improvement which comprises passing said mixture of hydrogen and carbon monoxide in a direction having a substantial horizontal component through a narrow continuous catalyst zone elongated in said direction, continuously draining liquid formed during said synthesis downwardly by gravity to the bottom side of said catalyst zone as soon as formed, immediately removing said liquid from the bottom side of said catalyst zone, and removing said gaseous effluent from the end opposite the inlet end of said reaction zone.

2. In a process for the synthesis of normally liquid hydrocarbons which comprises passing a mixture of hydrogen and carbon monoxide through a reaction zone in the presence of a suitable synthesis catalyst under reaction conditions, including a temperature in the range of 150 to 400° C., such that gaseous and liquid hydrocarbons are formed in said reaction zone under conditions prevailing therein, removing a gaseous effluent from said reaction zone, and separating normally liquid hydrocarbons therefrom, the method of improving the yield of said normally liquid hydrocarbons which comprises introducing said mixture of hydrogen and carbon monoxide into one end of a horizontally elongated continuous reaction zone, passing said mixture together with gaseous reaction products through said zone in contact with said catalyst toward the opposite end thereof, gravitating liquid products from said catalyst to the bottom of said zone as soon as formed, and immediately draining said liquid from the bottom of said zone thereby substantially decreasing contact time of said liquid and said catalyst with concomitant retardation of catalyst degradation due to carbonaceous deposit thereon and increase in the yield of normally liquid hydrocarbons.

3. A process for the synthesis of normally liquid hydrocarbons which comprises passing a synthesis gas comprising hydrogen and carbon monoxide in a ratio between 3:1 and 1:1 longitudinally through a plurality of narrow, horizontally elongated, enclosed, spaced-apart continuous catalyst zones in parallel flow, said zones being maintained under reaction conditions, including a temperature in the range of 150 to 400° C., for the synthesis of normally liquid hydrocarbons, whereby liquid hydrocarbons under said conditions are deposited on the catalyst in said zones; draining said liquid downwardly from said catalyst in each of said zones and immediately removing same from said zones at a plurality of points along the line of flow of said gas so as to avoid accumulation of liquid product on the catalyst therein; maintaining a cooling fluid in the space surrounding said catalyst zones; and collecting the synthesized hydrocarbons.

4. In a process for the synthesis of normally liquid hydrocarbons which comprises passing a mixture of hydrogen and carbon monoxide through a reaction zone in the presence of a synthesis catalyst under reaction conditions, including a temperature in the range of 150 to 400° C., such that gaseous and liquid hydrocarbons are formed in said reaction zone under conditions prevailing therein, removing a gaseous effluent from said reaction zone, and separating normally liquid hydrocarbons therefrom, the improvement which comprises introducing said mixture of hydrogen and carbon monoxide into one end of a narrow horizontally elongated continuous catalyst zone, gravitating the liquid formed during said synthesis to the lower side of said catalyst zone as soon as formed and removing same at a plurality of points along the bottom of said zone so as to minimize contact between said liquid and said catalyst, and removing a gaseous effluent from the other end of said catalyst zone.

ALFRED CLARK.

REFERENCES CITED

The following references are of record in the file of this patent:

UNITED STATES PATENTS

| Number | Name | Date |
|---|---|---|
| 33,952 | Lighthall | Dec. 17, 1861 |
| 275,367 | De La Vergne et al. | Apr. 10, 1883 |
| 1,340,889 | Gray | May 25, 1920 |
| 1,599,228 | Gibbs | Sept. 7, 1926 |
| 1,934,968 | Connolly | Nov. 14, 1933 |
| 2,028,100 | Dearborn et al. | Jan. 14, 1936 |
| 2,089,038 | Pyzel | Aug. 3, 1937 |
| 2,149,515 | Fischer | Mar. 6, 1939 |
| 2,206,500 | Fischer | July 2, 1940 |
| 2,244,210 | Nasham | June 3, 1941 |
| 2,247,087 | Herbert | June 24, 1941 |
| 2,307,672 | Dunham | Jan. 5, 1943 |
| 2,336,879 | Mekler | Dec. 14, 1943 |
| 2,411,760 | Sensel | Nov. 26, 1946 |